(12) United States Patent
Shoji

(10) Patent No.: US 12,199,800 B2
(45) Date of Patent: Jan. 14, 2025

(54) WIRELESS COMMUNICATION SYSTEM AND OPERATING METHOD OF WIRELESS COMMUNICATION SYSTEM

(71) Applicant: CANON KABUSHIKI KAISHA, Tokyo (JP)

(72) Inventor: Yuki Shoji, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 161 days.

(21) Appl. No.: 18/049,461

(22) Filed: Oct. 25, 2022

(65) Prior Publication Data

US 2023/0125898 A1    Apr. 27, 2023

(30) Foreign Application Priority Data

Oct. 26, 2021  (JP) .................................. 2021-174353

(51) Int. Cl.
*H04L 25/03* (2006.01)
(52) U.S. Cl.
CPC .............................. *H04L 25/03891* (2013.01)
(58) Field of Classification Search
CPC ......... H04L 25/03891; H04L 25/03012; H04L 25/03343; H04B 5/22; H04B 5/24; H04B 5/72

See application file for complete search history.

(56) References Cited

U.S. PATENT DOCUMENTS

| 2009/0275282 A1* | 11/2009 | LeVan ...................... H04B 5/26 455/41.1 |
| 2014/0273833 A1* | 9/2014 | McCormack ............ H04B 5/79 455/41.1 |

FOREIGN PATENT DOCUMENTS

JP         2016029785 A     3/2016

* cited by examiner

*Primary Examiner* — Vineeta S Panwalkar
(74) *Attorney, Agent, or Firm* — Canon U.S.A., Inc., IP Division

(57) ABSTRACT

A wireless communication system includes a first communication device and a second communication device. The first communication device includes a modulator configured to provide modulation and a first coupler configured to wirelessly transmit a signal. The second communication device includes a second coupler configured to wirelessly receive a signal by being coupled to the first coupler by at least one of electric-field coupling or magnetic-field coupling and a demodulator configured to provide demodulation. The first communication device or the second communication device includes an equalizer configured to provide equalization.

17 Claims, 11 Drawing Sheets

WIRELESS COMMUNICATION SYSTEM AND OPERATING METHOD OF WIRELESS COMMUNICATION SYSTEM

BACKGROUND

Field

The present disclosure relates to a wireless communication system and an operating method of the wireless communication system.

Description of the Related Art

In recent years, short-range wireless communication systems of providing wireless communication between adjacent antennas by electromagnetic field coupling have been developed. If wired connection for communication between electronic circuit boards or modules using connectors and harnesses can be changed to wireless connection, parts for connection units can be reduced, and as a result, the change brings advantages such as simplification of device manufacturing processes.

Japanese Patent Laid-Open No. 2016-29785 discloses a wireless communication system of transmitting binary baseband signals in a contactless manner by electromagnetic field coupling. In this wireless communication system, couplers respectively provided for a transmitter and a receiver face each other across a short distance; by electromagnetic field coupling between the couplers, wireless communication is established. Specifically, when a baseband signal is inputted to the transmitter-side coupler, a signal of the waveform of an inexact differential is generated in the receiver-side coupler by electromagnetic field coupling. By shaping this signal with a hysteresis comparator, the receiver reconstructs the transmitted baseband signal.

Because the amount of data transmitted within a device or between devices has been increasing for years, demands have arisen for high-speed communication with wireless communication systems.

SUMMARY

Various embodiments of the present disclosure achieve high communication speeds in wireless communication.

According to one embodiment, a wireless communication system includes a first communication device and a second communication device. The first communication device includes a modulator configured to provide modulation and a first coupler configured to wirelessly transmit a signal. The second communication device includes a second coupler configured to wirelessly receive a signal by being coupled to the first coupler by at least one of electric-field coupling or magnetic-field coupling and a demodulator configured to provide demodulation. The first communication device or the second communication device includes an equalizer configured to provide equalization.

Further features of the present disclosure will become apparent from the following description of example embodiments with reference to the attached drawings.

DESCRIPTION OF THE EMBODIMENTS

First Embodiment

System Configuration

Figure 1A:
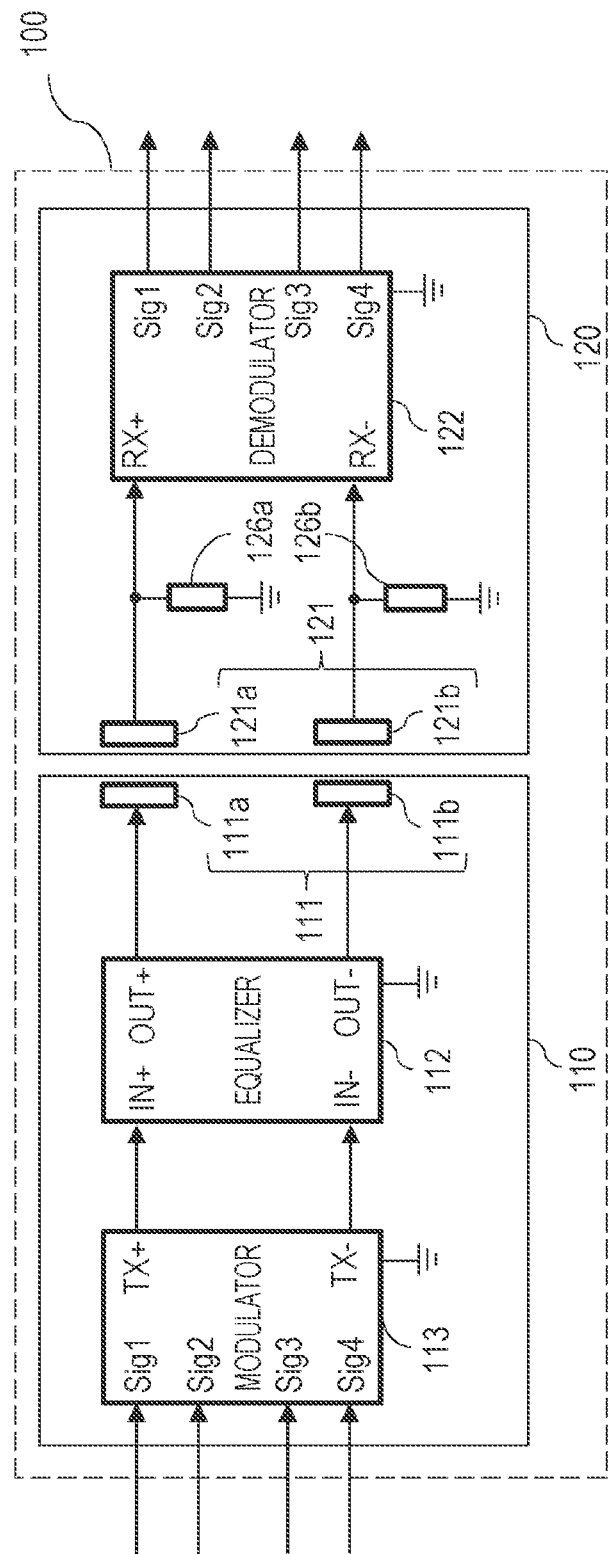
FIGS. 1A and 1B illustrate examples of a configuration of a wireless communication system.

Hereinafter, a first embodiment will be described with reference to the drawings. FIG. 1A illustrates an example of a configuration of a wireless communication system 100 according to the first embodiment. In the following, the wireless communication system 100 is referred to as the system 100. The system 100 includes a wireless communication module 110 and a wireless communication module 120, and wireless communication is provided between the wireless communication module 110 and the wireless communication module 120. In the following, the wireless communication module 110 is referred to as the module 110, and the wireless communication module 120 is referred to as the module 120. In other words, the modules 110 and 120 each function as a communication device for providing wireless communication.

The module 110 includes a coupler 111, an equalizer 112, and a modulator 113. The module 120 includes a coupler 121, a demodulator 122, and termination resistors 126a and 126b.

The modulator 113 performs multiple-symbol modulation on a plurality of data signals Sig1 to Sig4 to compress the frequency band and outputs transmit signals TX+ and TX−. The transmit signals TX+ and TX− are differential signals in antiphase. Examples of multiple-symbol modulation include quadrature phase-shift keying (QPSK), quadrature amplitude modulation (QAM), and orthogonal frequency-division multiplexing (OFDM).

If the modulator 113 is not provided in the module 110, the module 110 needs to have couplers 111 equal in number to the data signals Sig1 to Sig4. Because the modulator 113 is provided in the module 110, the data signals Sig1 to Sig4 can be transmitted in a wireless manner with one coupler 111. This configuration can decrease the number of couplers 111 in the module 110 and reduces the area for couplers 111.

The equalizer 112 receives the transmit signals TX+ and TX− from the modulator 113 as transmit signals IN+ and IN−. The equalizer 112 performs equalization on the transmit signals IN+ and IN− and outputs transmit signals OUT+ and OUT− to the coupler 111. The transmit signals OUT+ and OUT− are a pair of differential signals.

The coupler 111 includes two discrete electrodes 111a and 111b. The electrode 111a receives the transmit signal OUT+ as an input. The electrode 111b receives the transmit signal OUT− as an input. The coupler 121 includes two discrete electrodes 121a and 121b.

The couplers 111 and 121 face each other across a short distance, so that the couplers 111 and 121 are coupled to each other by electromagnetic field coupling. More specifically, the electrodes 111a and 121a face each other, and the electrodes 111b and 121b face each other.

Electromagnetic field coupling includes both electric-field coupling and magnetic-field coupling. This means that wireless communication between the modules 110 and 120 may be established by electric-field coupling, magnetic-field coupling, or both electric-field coupling and magnetic-field coupling.

In the following description, it is assumed that the couplers 111 and 121 are coupled to each other mainly via an electric field.

The electrode 111a wirelessly transmits the transmit signal OUT+ to the electrode 121a. The electrode 121a wirelessly receives a receive signal RX+ from the electrode 111a. The electrode 111b wirelessly transmits the transmit signal OUT− to the electrode 121b. The electrode 121b wirelessly receives a receive signal RX− from the electrode 111b. The demodulator 122 receives the receive signal RX+ as an input from the electrode 121a and the receive signal RX− as an input from the electrode 121b. The termination resistor 126a is coupled to an interconnection node between the electrode 121a and one input terminal of the demodulator 122. The termination resistor 126b is coupled to an interconnection node between the electrode 121b and the other input terminal of the demodulator 122.

The equalizer 112 wirelessly transmits the transmit signals OUT+ and OUT− via the couplers 111 and 121 to the demodulator 122. The demodulator 122 wirelessly receives the receive signals RX+ and RX− from the equalizer 112 via the couplers 111 and 121.

The transmit signals OUT+ and OUT− transmitted by the equalizer 112 are differential signals. The receive signals RX+ and RX− received by the demodulator 122 are also differential signals. This means that antiphase signals are inputted to the electrodes 111a and 111b, and antiphase signals are outputted from the electrodes 121a and 121b. When the coupler 111 receives the transmit signals OUT+ and OUT−, the coupler 121 outputs the receive signals RX+ and RX− with the help of electric-field coupling.

The demodulator 122 reconstructs the data signals Sig1 to Sig4 by performing multiple-symbol demodulation on the receive signals RX+ and RX− outputted by the coupler 121.

The demodulation by the demodulator 122 corresponds to the modulation by the modulator 113. The data signals Sig1 to Sig4 outputted by the demodulator 122 are substantially the same as the data signals Sig1 to Sig4 received by the modulator 113.

Figure 2A:
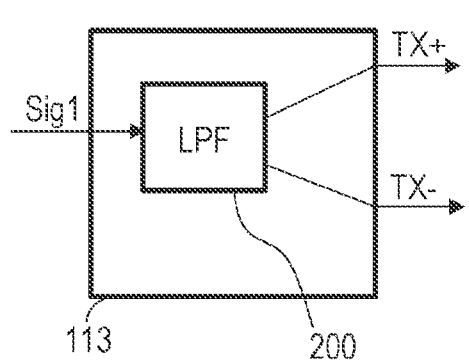
FIGS. 2A and 2B illustrate examples of a configuration of a modulator.

FIG. 2A illustrates an example of a configuration of the modulator 113. The modulator 113 may receive one data signal Sig1. The modulator 113 performs modulation on the data signal Sig1 and outputs the transmit signals TX+ and TX−. The modulator 113 includes a low-pass filter (LPF) 200. The modulator 113 performs low-pass filter operation on the data signal Sig1 to limit the frequency band and outputs the transmit signals TX+ and TX−.

Figure 2B:
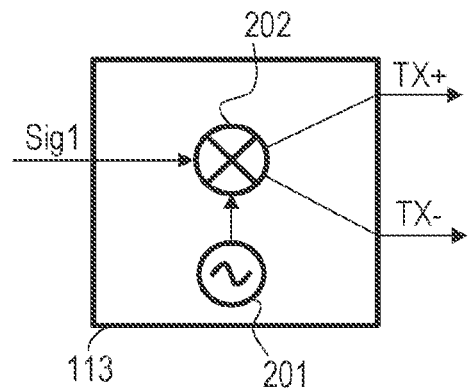

FIG. 2B illustrates another example of a configuration of the modulator 113. The modulator 113 performs modulation on the data signal Sig1 and outputs the transmit signals TX+ and TX−. The modulator 113 includes a carrier wave generator 201 and a multiplier 202. The multiplier 202 multiplies the data signal Sig1 by a carrier wave generated by the carrier wave generator 201 to convert the frequency and outputs the transmit signals TX+ and TX−. For example, when the data signal Sig1 is a square signal (base band data), a binary phase shift keying (BPSK) modulation signal is generated. By configuring the modulator 113 as a quadrature modulator, various kinds of modulation can be provided. The modulator 113 may be implemented by digital signal processing operation or an electronic circuit.

The transmission characteristic between the couplers 111 and 121 coupled by electromagnetic field coupling indicates that as the frequency of the transmitting signal lowers, the gain (the intensity of the output signal from the coupler 121) decreases. The equalizer 112 performs an equalization operation indicating a transmission characteristic opposite to the transmission characteristic between the couplers 111 and 121.

This means that the equalizer 112 has a transmission characteristic in which as the frequency of the input signal to the equalizer 112 lowers, the intensity of the output signal from the equalizer 112 increases. By multiplying the transmission characteristic of the equalizer 112 by the transmission characteristic between the couplers 111 and 121, it is possible to expand the frequency band with constant gain (the intensity of the output signal from the coupler 121). The function of the equalizer 112 can be implemented by an electronic circuit or digital signal processing operation.

The equalizer 112 may be provided in a stage before the modulator 113. In this case, the equalizer 112 performs equalization on a data signal. The modulator 113 performs modulation on the data signal equalized by the equalizer 112 and outputs the transmit signals TX+ and TX−. The electrode 111a wirelessly transmits the transmit signal TX+ to the electrode 121a. The electrode 111b wirelessly transmits the transmit signal TX-to the electrode 121b.

Figure 3A:
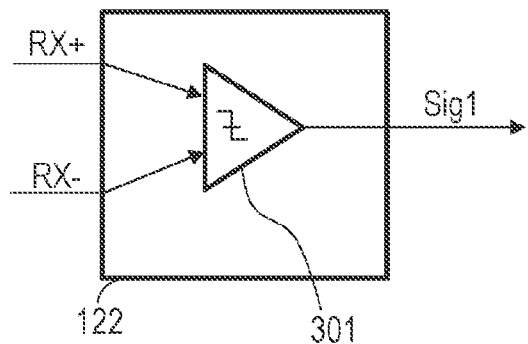
FIGS. 3A and 3B illustrate examples of a configuration of a demodulator.

FIG. 3A illustrates an example of a configuration of the demodulator 122. When the modulator 113 receives one data signal Sig1 as an input, the demodulator 122 outputs one data signal Sig1. The demodulator 122 demodulates the receive signals RX+ and RX− and outputs the data signal Sig1. The demodulator 122 includes a determiner 301; the demodulator 122 specifies the receive signals RX+ and RX− and accordingly outputs the data signal Sig1. The determiner 301 outputs the data signal Sig1 as a determination result based on the code or intensity of the receive signals (differential signals) RX+ and RX−

Figure 3B:
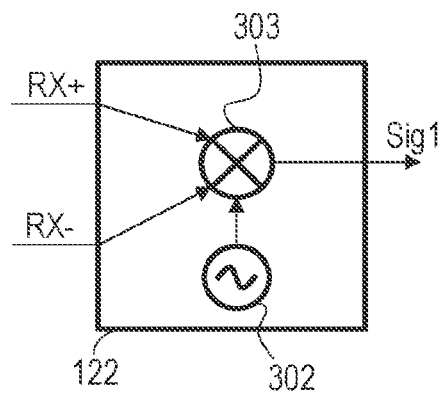

FIG. 3B illustrates another example of a configuration of the demodulator 122. The demodulator 122 demodulates the receive signals RX+ and RX− and outputs the data signal Sig1. The demodulator 122 in FIG. 3B operates in combination with the modulator 113 in FIG. 2B. The demodulator 122 includes a local oscillator 302 and a multiplier 303. The multiplier 303 multiplies the receive signals RX+ and RX− by the output signal from the local oscillator 302 to convert the frequency and outputs the data signal Sig1. By configuring the demodulator 122 as a quadrature demodulator, various kinds of demodulation can be provided. The demodulator 122 may be implemented by digital signal processing operation or an electronic circuit.

Figure 4B:
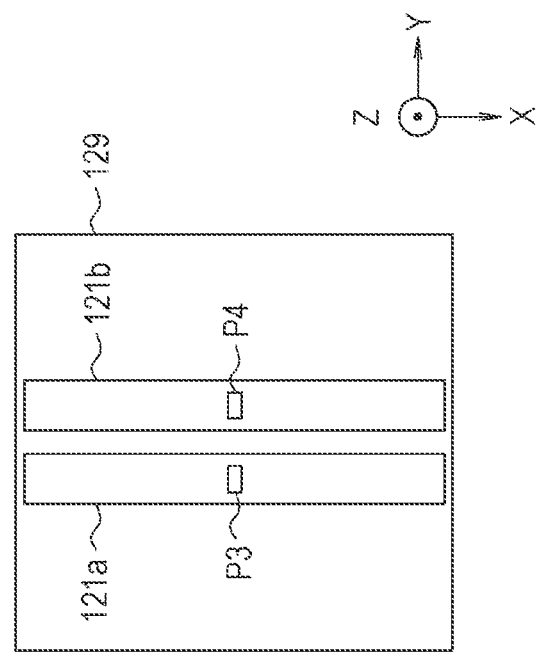
FIGS. 4A and 4B illustrate structures of couplers.
Figure 4A:
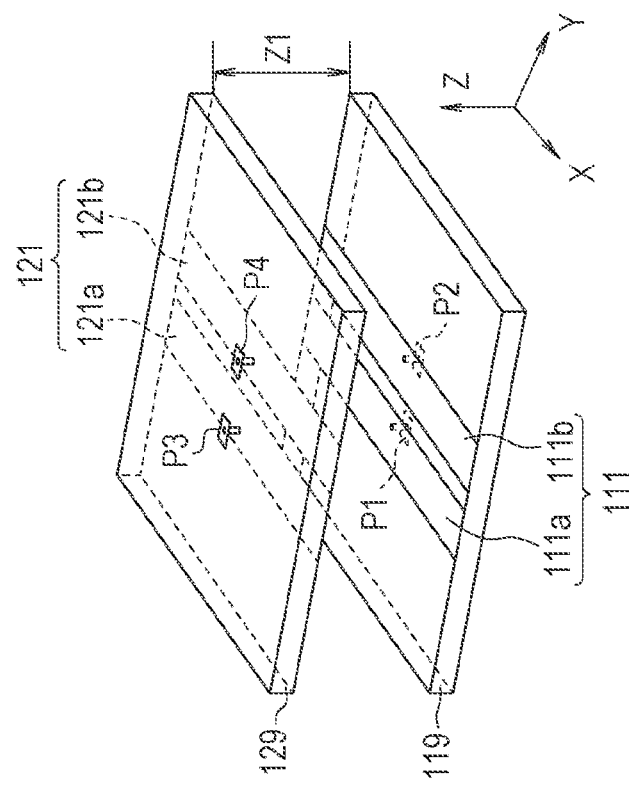

FIGS. 4A and 4B illustrate an example of structures of the couplers 111 and 121. FIG. 4A is a perspective view of structures of the couplers 111 and 121. FIG. 4B is a plan view of the structures of the couplers 111 and 121 when viewed in the Z-axis direction. Connectors P1, P2, P3, and P4 are connectors (feeding portions) respectively coupling the electrodes 111a, 111b, 121a, and 121b to transmission lines.

The electrodes 111a and 111b are formed on one surface of a dielectric layer 119. The electrodes 121a and 121b are formed on one surface (the surface facing the dielectric layer 119) of a dielectric layer 129. In the present embodiment, the couplers 111 and 121 are patterned on a substrate such as a rigid substrate or flexible substrate. The couplers 111 and 121 may be made of, for example, a metal plate. As illustrated in FIGS. 4A and 4B, the couplers 111 and 121 face each other across a short distance, and as a result, electric-field coupling is caused between the couplers 111 and 121. The distance between the couplers 111 and 121 in the Z-axis direction is Z1.

The system 100 having the configuration as described above can be installed in, for example, an imaging device or motor-driven machine. In the case in which the system 100 is installed in a camera as an imaging device, the module 110 may be included in the main body of the camera, and the module 120 may be included in an accessory of the camera; transmit signals representing image data obtained by the main body may be wirelessly transmitted to the accessory. The imaging device is not limited to a camera and may be a computed tomographic (CT) imaging device. Specifically, the module 110 may be included in a rotating unit of the CT imaging device, and the module 120 may be included in a fixed unit of the CT imaging device; transmit signals representing image data obtained by the rotating unit may be wirelessly transmitted to the fixed unit.

In the case in which the system 100 is installed in a robot arm as a motor-driven machine, the module 110 may be included in an arm portion, and the module 120 may be included in a hand portion; control signals for controlling operations of the hand portion may be wirelessly transmitted from the arm portion. The module 120 may control operations of the hand portion based on receive signals received by the demodulator 122. The motor-driven machine is not limited to a robot arm and may be a semiconductor photolithography system. Specifically, the module 120 may control movement of a movable stage of a photolithography system based on receive signals received wirelessly. Another example is that the module 110 may be included in the main body of an ink jet printer, and the module 120 may be included in a print head; discharging ink may be controlled based on receive signals wirelessly received by the module 120. These examples are not to be interpreted as limiting, and the system 100 may be installed in any applications.

Figure 5:
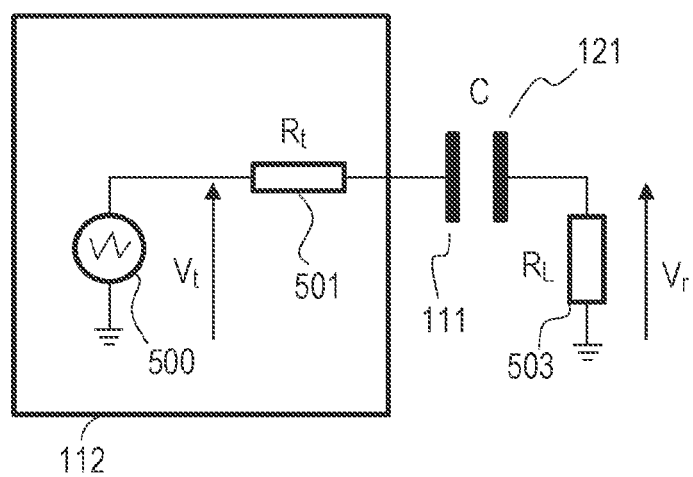
FIG. 5 illustrates an equivalent circuit of the wireless communication system.

FIG. 5 illustrates an equivalent circuit of the system 100. The transmission characteristic between the couplers 111 and 121 coupled by electromagnetic field coupling will be described using the equivalent circuit illustrated in FIG. 5. The equalizer 112 includes a signal source 500 and a resistance 501. The resistance 501 corresponds to the output impedance of the equalizer 112. Here, the resistance 501 is $R_t$. The signal source 500 outputs a voltage $V_t$. Given that the couplers 111 and 121 are coupled to each other via an electric field, the degree of coupling (capacitance) is C[F]. A resistance 503 is a combined resistance of the termination resistors 126a and 126b in FIG. 1A. Here, the resistance 503 is $R_L$.

The output signal voltage at the resistance 503 from the coupler 121 is $V_r$. With this equivalent circuit, the ratio of the output signal voltage $V_r$ of the coupler 121 to the output signal voltage $V_t$ of the signal source 500 is expressed as Expression (1).

$$\frac{V_r}{V_t} = \frac{j\omega C R_L}{1 + j\omega C(R_t + R_L)} \quad (1)$$

The ratio of the voltage $V_r$ to the voltage $V_t$ represents the transmission characteristic from the equalizer 112 to the termination resistors 126a and 126b. Expression (2) is a mathematical expression obtained by subjecting Expression (1) to the Laplace transform.

$$G_{Cap}(s) = \frac{sCR_L}{1 + sC(R_t + R_L)} \quad (2)$$

Figure 6:
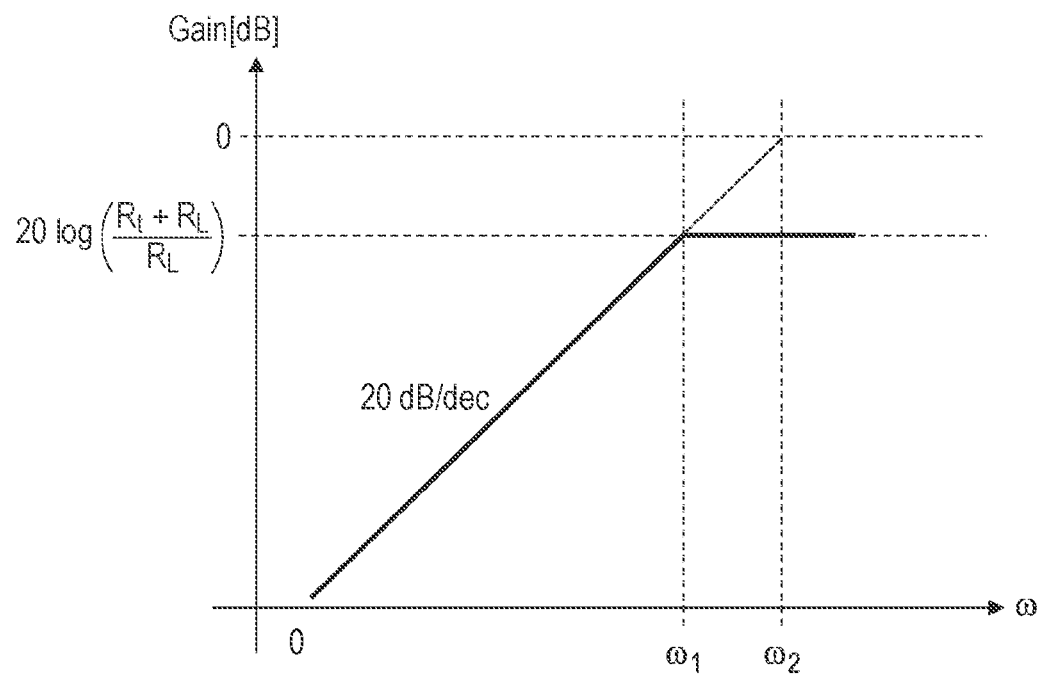
FIG. 6 illustrates an example of the transmission characteristic between the couplers.

FIG. 6 is a graph illustrating the transmission characteristic given by Expression (2). In FIG. 6, $\omega_1$ is given by Expression (3), and $\omega_2$ is given by Expression (4).

$$\omega_1 = \frac{1}{C(R_t + R_L)} \quad (3)$$

$$\omega_2 = \frac{1}{CR_L} \quad (4)$$

When the frequency is $\omega_1$ or higher, the resistance $R_L$ and the resistance $R_t$ are sufficiently high with respect to the impedance of the degree of coupling C, and a voltage obtained by dividing the output signal voltage $V_t$ from the signal source 500 by the resistance $R_L$ and the resistance $R_t$ is outputted as the output signal voltage $V_r$ from the coupler 121. As a result, when the frequency is $\omega_1$ or higher, gain can be approximated as a constant level.

By contrast, when the frequency is $\omega_1$ or lower, the impedance of the degree of coupling C is significant with respect to the resistance $R_L$ and the resistance $R_t$. The impedance of the degree of coupling C increases as the frequency lowers; in response to this, the output signal voltage $V_r$ from the coupler 121 lowers.

To wirelessly transmit wide-band data with the system 100, it is desirable that gain is constant over a wide band, and additionally, the constant gain level is a high level. For example, when the couplers 111 and 121 are spaced apart from each other by several mm, the degree of coupling C between the couplers 111 and 121 is about several fF to several pF. Given that the resistance $R_L$ and the resistance $R_t$ are both 100Ω, $\omega_1$ is several GHz at a moderate estimate. $\omega_1$ is the lowest frequency of a frequency band that enables a constant level of gain and that is advantageous in wireless data transmission. When the frequency bandwidth is not expanded by the equalizer 112, the modulator 113 and the demodulator 122 constituting the system 100 need to be operable at least $\omega_1$ (several GHz). This raises problems in view of cost, electricity consumption, and other aspects. Furthermore, the frequency band of $\omega_1$ and lower frequencies is cut off because the frequency band is not advantageous in wireless data transmission. Consequently, the efficiency of frequency use decreases. To solve the problems described above, the equalizer 112 is provided.

Figure 7:
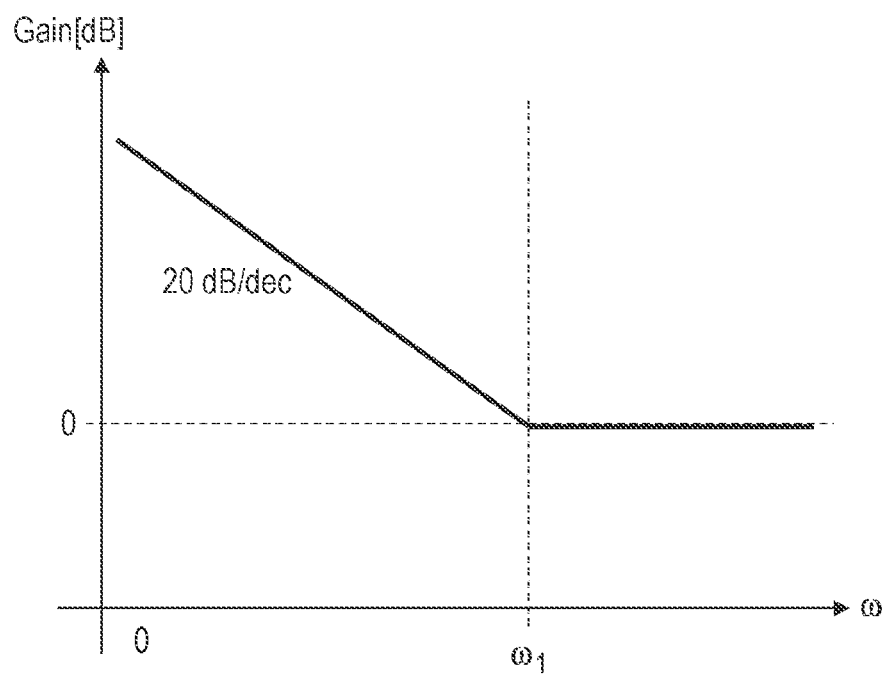
FIG. 7 illustrates an example of the transmission characteristic of an equalizer.

FIG. 7 is a graph illustrating an example of the transmission characteristic of the equalizer 112. This transmission characteristic is expressed as Expression (5).

$$G_{EQ}(s) = \frac{C(R_t + R_L)s + 1}{C(R_t + R_L)s} \quad (5)$$

The transmission characteristic from input to the equalizer 112 to output from the coupler 121 is expressed by the product of Expressions (2) and (5). The product of Expressions (2) and (5) is expressed as Expression (6).

$$G(s) = G_{Cap}(s) \cdot G_{EQ}(s) = \frac{R_L}{R_t + R_L} \quad (6)$$

As understood from Expression (6), with the help of the equalizer 112, the transmission characteristic is uniquely given based on the ratio of the resistance $R_L$ to the resistance $R_t$ regardless of frequency. This means that in principle gain is constant over all frequency bands, and as a result, wideband data can be wirelessly transmitted.

However, in practice, loss is caused in high ranges depending on the physical shape of the couplers 111 and 121. Additionally, the gain of the equalizer 112 saturates at a finite level, and thus, it is impossible to completely maintain gain at a constant level in low ranges.

Figure 8A:
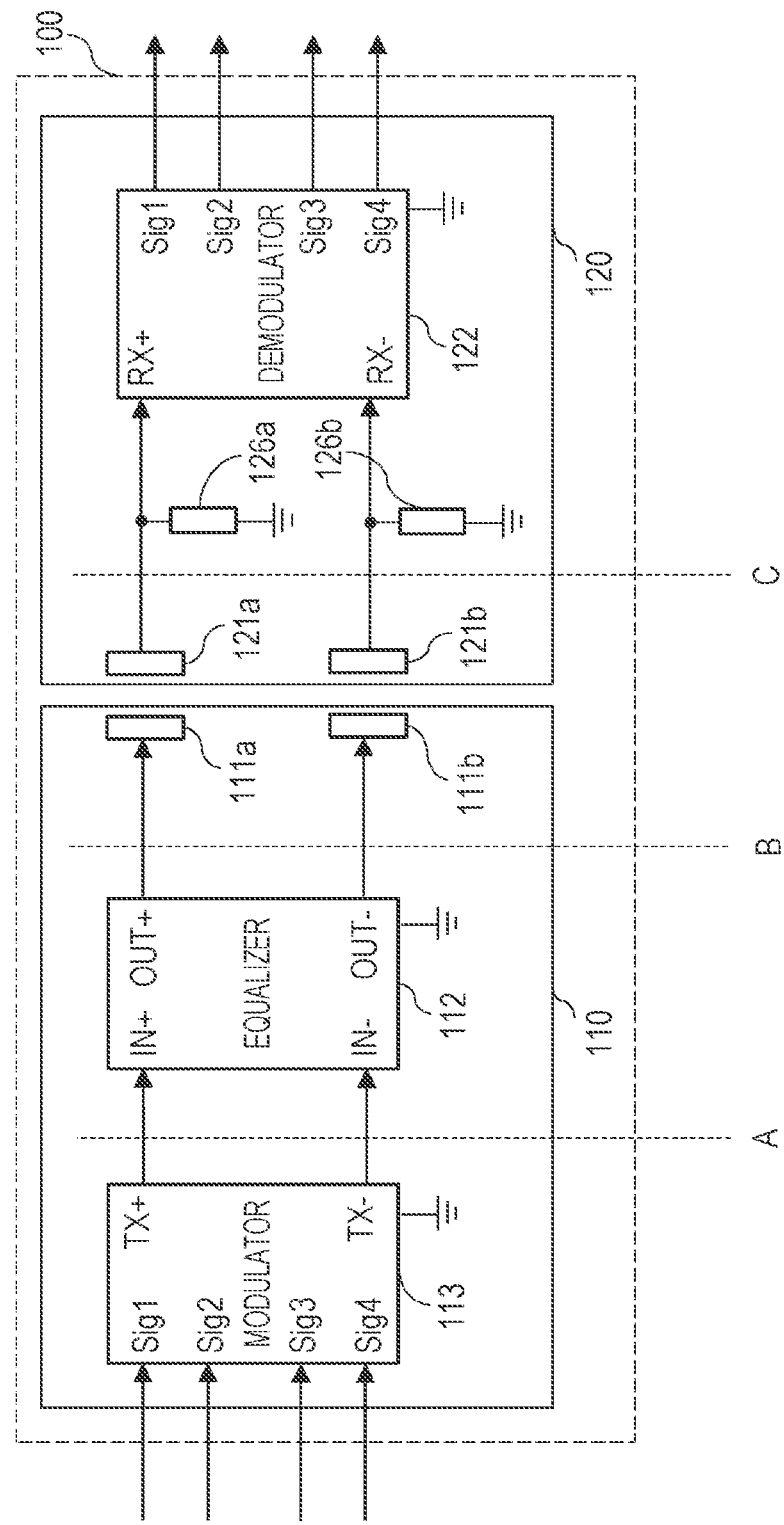
FIGS. 8A and 8B illustrate the effect of expanding the frequency bandwidth with the equalizer.
Figure 8B:
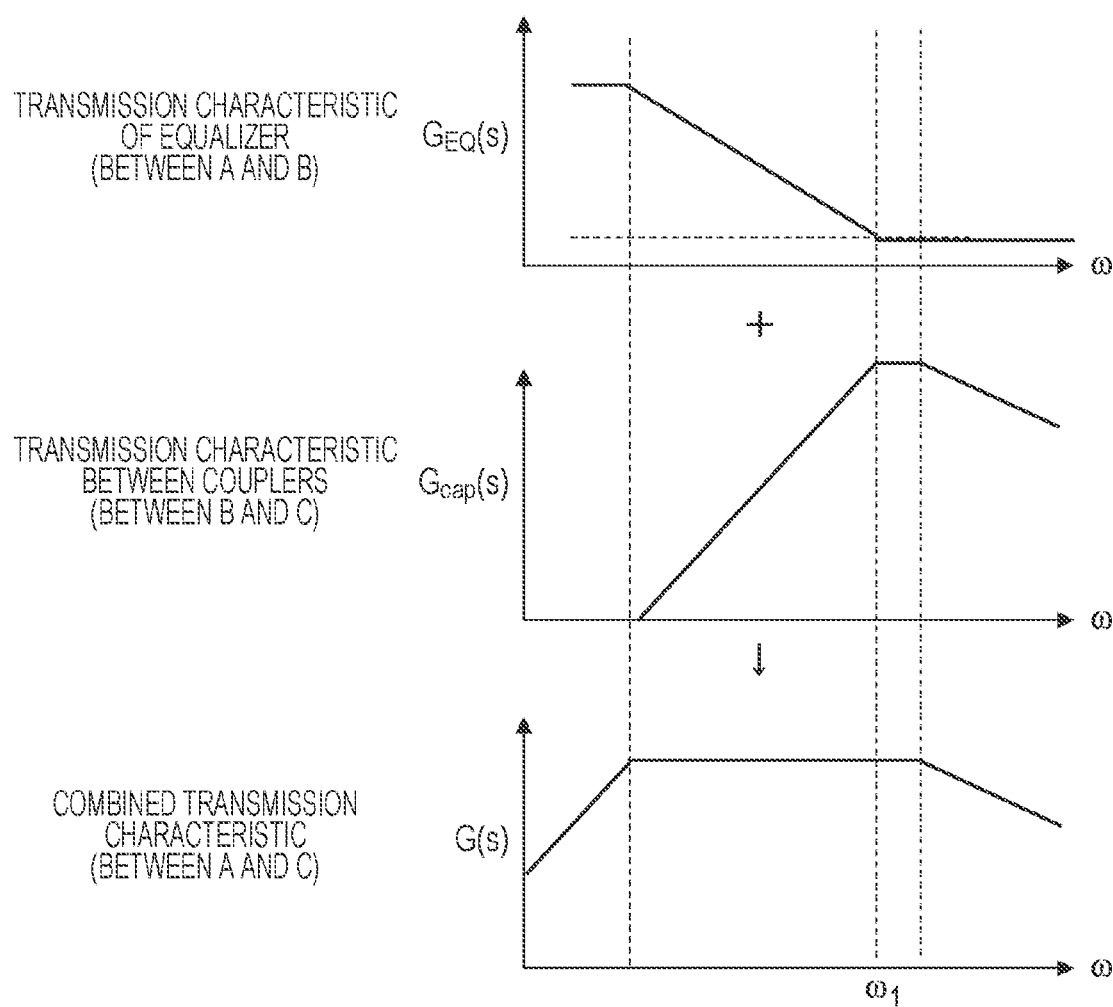

FIG. 8A illustrates locations in the system 100 corresponding to transmission characteristics illustrated in FIG. 8B. FIG. 8B provides, in order from top to bottom, a graph illustrating the transmission characteristic expressed as Expression (5), a graph illustrating the transmission characteristic expressed as Expression (2), and a graph illustrating the transmission characteristic expressed as Expression (6). The transmission characteristic expressed as Expression (5) indicates the transmission characteristic between A and B in FIG. 8A, which is a transmission characteristic $G_{EQ}(s)$ of the equalizer 112. The transmission characteristic expressed as Expression (2) indicates the transmission characteristic between B and C in FIG. 8A, which is a transmission characteristic $G_{Cap}(s)$ between the couplers 111 and 121. The transmission characteristic expressed as Expression (6) indicates the transmission characteristic between A and C in FIG. 8A, which is a transmission characteristic G(s) from input to the equalizer 112 to output from the coupler 121.

Due to loss in high ranges depending on the physical shape of the couplers 111 and 121 and gain saturation of the equalizer 112, the gain decreases in high and low ranges in the transmission characteristic G(s). As described above, as compared with the transmission characteristic $G_{Cap}(s)$, by using the equalizer 112, the transmission characteristic G(s) indicates that the lower limit of frequency band advantageous in wireless data transmission can be decreased to $\omega_1$ or lower, and as a result, wide-band data can be wirelessly transmitted. Further, with the transmission characteristic G(s), because the lower limit of frequency band advantageous in wireless data transmission is decreased to $\omega_1$ or lower, the modulator 113 and the demodulator 122 constituting the system 100 are operable at lower frequencies. This is advantageous in view of cost, electricity consumption, and other aspects.

Figure 1B:
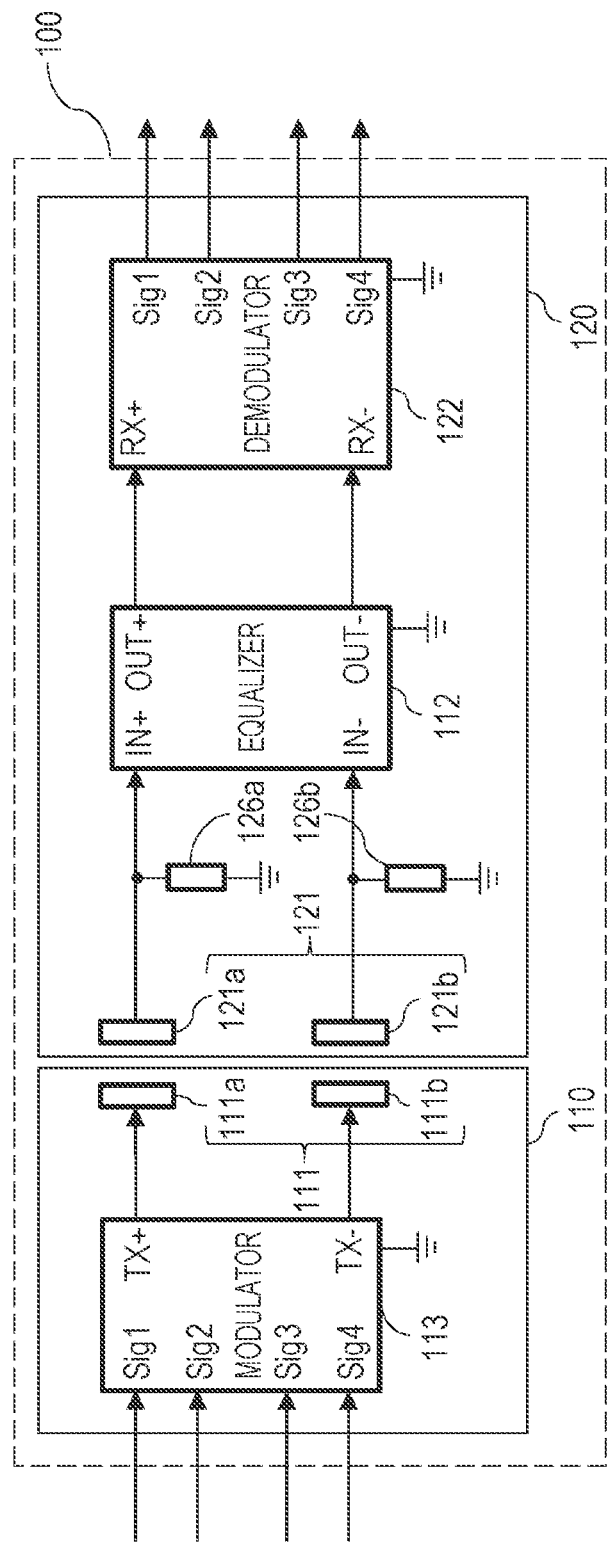

FIG. 1B illustrates another example of a configuration of the system 100. The system 100 in FIG. 1B differs from the system 100 in FIG. 1A in the position of the equalizer 112. The system 100 includes the modules 110 and 120. The module 110 includes the modulator 113 and the coupler 111. The coupler 111 includes the electrodes 111a and 111b. The module 120 includes the coupler 121, the termination resistors 126a and 126b, the equalizer 112, and the demodulator 122. The coupler 121 includes the electrodes 121a and 121b.

The modulator 113 performs multiple-symbol modulation on a plurality of data signals Sig1 to Sig4 to compress the frequency band and outputs transmit signals TX+ and TX−. The transmit signals TX+ and TX− are a pair of differential signals. The electrode 111a wirelessly transmits the transmit signal TX+ to the electrode 121a. The electrode 111b wirelessly transmits the transmit signal TX-to the electrode 121b.

The termination resistor 126a is coupled to an interconnection node between the electrode 121a and one input terminal of the equalizer 112. The termination resistor 126b is coupled to an interconnection node between the electrode 121b and the other input terminal of the equalizer 112. The electrode 121a wirelessly receives a receive signal IN+ from the electrode 111a. The electrode 121b wirelessly receives a receive signal IN− from the electrode 111b.

The equalizer 112 performs equalization on the receive signals IN+ and IN− and outputs receive signals OUT+ and OUT−. The receive signals OUT+ and OUT− are a pair of differential signals. The equalization indicates a transmission characteristic opposite to the transmission characteristic between the couplers 111 and 121.

The demodulator 122 receives the receive signals OUT+ and OUT− from the equalizer 112 as the receive signals RX+ and RX−. The demodulator 122 reconstructs the data signals Sig1 to Sig4 by performing multiple-symbol demodulation on the receive signals RX+ and RX−. The data signals Sig1 to Sig4 outputted by the demodulator 122 are substantially the same as the data signals Sig1 to Sig4 received by the modulator 113.

The system 100 in FIG. 1B can achieve the same effect as the system 100 in FIG. 1A

As described above, in FIGS. 2A to 3B, the modulator 113 receives one data signal Sig1, and the demodulator 122 outputs one data signal Sig1. In this case, the module 110 includes the modulator 113 for providing modulation and the coupler 111 for wirelessly transmitting a signal. The module 120 includes the coupler 121 for wirelessly receiving a signal by being coupled to the coupler 111 by at least one of electric-field coupling or magnetic-field coupling and the demodulator 122 for providing demodulation. The module 110 or 120 includes the equalizer 112 for providing equalization.

The equalizer 112 provides equalization to increase the gain in lower frequency regions with respect to the transmission characteristic between the couplers 111 and 121. The module 120 includes the termination resistors 126a and 126b coupled to the coupler 121.

In FIG. 1A, the module 110 includes the equalizer 112. The equalizer 112 performs equalization on a signal modulated by the modulator 113 and outputs the equalized signal to the coupler 111. The demodulator 122 performs demodulation on a signal wirelessly received by the coupler 121.

In FIG. 1B, the module 120 includes the equalizer 112. The modulator 113 outputs a modulated signal to the coupler 111. The equalizer 112 performs equalization on a signal wirelessly received by the coupler 121. The demodulator 122 performs demodulation on the signal equalized by the equalizer 112.

The equalizer 112 may be provided in a stage before the modulator 113. In this case, the module 110 includes the equalizer 112. The modulator 113 performs modulation on a signal equalized by the equalizer 112 and outputs the modulated signal to the coupler 111. The demodulator 122 performs demodulation on a signal wirelessly received by the coupler 121.

In the present embodiment, the equalizer 112 can expand the transmit bandwidth (the frequency bandwidth usable for transmission) between the couplers 111 and 121. As a result, the system 100 can achieve the effect of increasing the speed of wireless communication and the transmittable data amount. The modulator 113 may receive one data signal Sig1 or a plurality of data signals Sig1 to Sig4.

The following describes the case in which the modulator 113 receives a plurality of data signals Sig1 to Sig4. The module 110 includes the modulator 113 for generating one signal by providing modulation on a plurality of data signals and the coupler 111 for wirelessly transmitting a signal. The module 120 includes the coupler 121 for wirelessly receiving a signal by being coupled to the coupler 111 by at least one of electric-field coupling or magnetic-field coupling and the demodulator 122 for providing demodulation to reconstruct the plurality of data signals. The module 110 or 120 includes the equalizer 112 for providing equalization. It should be noted that the equalizer 112 is not necessarily included.

In FIG. 1A, the module 110 includes the equalizer 112. The equalizer 112 performs equalization on one signal generated by the modulator 113 and outputs the one signal equalized to the coupler 111. The demodulator 122 reconstructs the plurality of data signals by performing demodulation on one signal wirelessly received by the coupler 121.

In FIG. 1B, the module 120 includes the equalizer 112. The modulator 113 outputs the one signal generated to the coupler 111. The equalizer 112 performs equalization on one signal wirelessly received by the coupler 121. The demodulator 122 reconstructs the plurality of data signals by performing demodulation on one signal equalized by the equalizer 112.

The equalizer 112 may be provided in a stage before the modulator 113. In this case, the module 110 includes the equalizer 112. The equalizer 112 performs equalization on a plurality of data signals. The modulator 113 generates one signal by performing modulation on the plurality of data signals equalized by the equalizer 112 and outputs the one signal generated to the coupler 111. The demodulator 122 reconstructs the plurality of data signals by performing demodulation on one signal wirelessly received by the coupler 121.

In the present embodiment, the modulator 113 can increase the amount of data per frequency band unit by performing modulation on a plurality of data signals. As a result, the system 100 can achieve the effect of increasing the amount of data transmittable within the limited transmit bandwidth (the frequency bandwidth usable for transmission) between the couplers 111 and 121 and increasing the speed of wireless communication. It should be noted that the equalizer 112 is not necessarily included.

Second Embodiment

Figure 9:
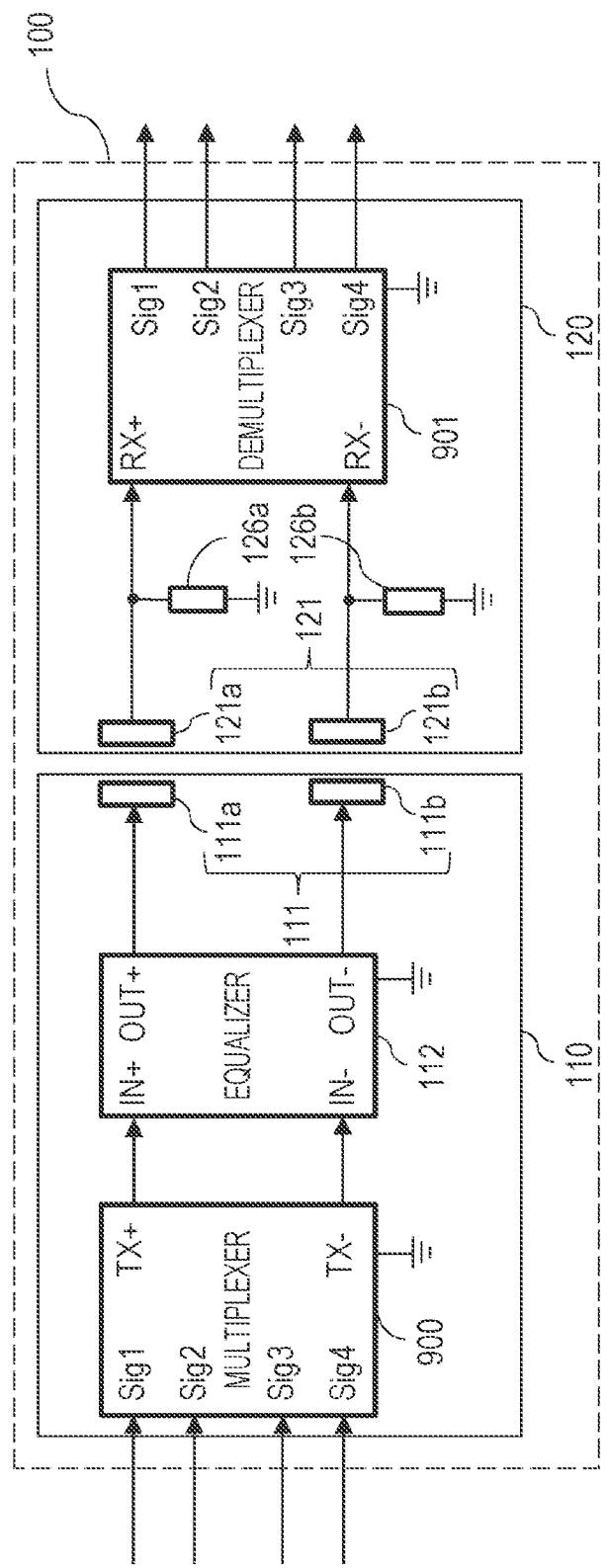
FIG. 9 illustrates an example of a configuration of a wireless communication system.

FIG. 9 illustrates an example of a configuration of the system 100 according to a second embodiment. The system 100 in FIG. 9 is formed by replacing the modulator 113 and the demodulator 122 with a multiplexer 900 and a demultiplexer 901 in the system 100 in FIG. 1. The following describes differences between the first and second embodiments.

The system 100 includes the modules 110 and 120. The module 110 includes the multiplexer 900, the equalizer 112, and the coupler 111. The coupler 111 includes the electrodes 111a and 111b. The module 120 includes the coupler 121, the termination resistors 126a and 126b, and the demultiplexer 901. The coupler 121 includes the electrodes 121a and 121b.

The multiplexer 900 performs multiplexing on the data signals Sig1 to Sig4 and outputs the transmit signals TX+ and TX−. The transmit signals TX+ and TX− are differential signals in antiphase. Examples of the multiplexing include code-division multiple access (CDMA), time-division multiple access (TDMA), and frequency-division multiple access (FDMA). TDMA includes Serializer/Deserializer (SerDes).

If the multiplexer 900 is not provided in the module 110, the module 110 needs to have couplers 111 equal in number to the data signals Sig1 to Sig4. Because the multiplexer 900 is provided in the module 110, the data signals Sig1 to Sig4 can be transmitted in a wireless manner with one coupler 111. This configuration can decrease the number of couplers 111 in the module 110 and reduces the area for couplers 111.

The equalizer 112 receives the transmit signals TX+ and TX− from the multiplexer 900 as the transmit signals IN+ and IN−. The equalizer 112 performs equalization on the transmit signals IN+ and IN− and outputs the transmit signals OUT+ and OUT−. The transmit signals OUT+ and OUT− are a pair of differential signals. The equalization indicates a transmission characteristic opposite to the transmission characteristic between the couplers 111 and 121.

The electrode 111a wirelessly transmits the transmit signal OUT+ to the electrode 121a. The electrode 111b wirelessly transmits the transmit signal OUT− to the electrode 121b.

The termination resistor 126a is coupled to an interconnection node between the electrode 121a and one input terminal of the demultiplexer 901. The termination resistor 126b is coupled to an interconnection node between the electrode 121b and the other input terminal of the demultiplexer 901. The electrode 121a wirelessly receives the receive signal RX+ from the electrode 111a. The electrode 121b wirelessly receives the receive signal RX− from the electrode 111b.

The demultiplexer 901 reconstructs the data signals Sig1 to Sig4 by performing demultiplexing on the receive signals RX+ and RX−. The data signals Sig1 to Sig4 outputted by the demultiplexer 901 are substantially the same as the data signals Sig1 to Sig4 received by the multiplexer 900. The demultiplexer 901 is, for example, a CDMA, TDMA, or FDMA demultiplexer.

Figure 10A:
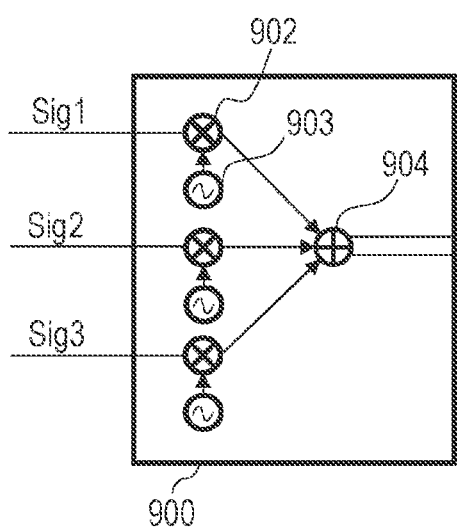
FIGS. 10A and 10B illustrate an example of a multiplexer and a demultiplexer.

FIG. 10A illustrates an example of a configuration of the multiplexer 900; FIG. 10A illustrates an example of the multiplexer 900 configured as a FDMA multiplexer. The multiplexer 900 includes a plurality of multipliers 902, a plurality of subcarrier wave generators 903, and an adder 904. The multipliers 902 provides frequency conversion by multiplying the data signals Sig1 to Sig3 by subcarrier signals generated by the subcarrier wave generators 903. The adder 904 adds up output signals from the multipliers 902 and outputs the transmit signals TX+ and TX−.

The subcarrier wave generators 903 respectively generate subcarrier signals of different frequencies (discrete frequencies). For this reason, when the adder 904 adds up output signals from the multipliers 902, the data signals Sig1 to Sig3 do not interfere with each other. As a result, the data signals Sig1 to Sig3 can be reconstructed by the demultiplexer 901 performing demultiplexing.

Figure 10B:
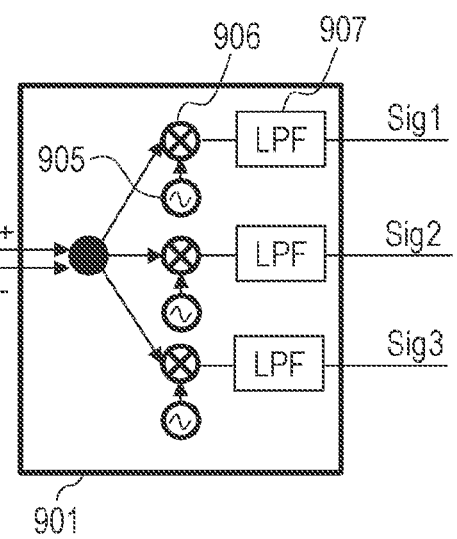

FIG. 10B illustrates an example of a configuration of the demultiplexer 901; FIG. 10B illustrates an example of the demultiplexer 901 configured as a FDMA demultiplexer. The demultiplexer 901 includes a plurality of multipliers 906, a plurality of subcarrier wave generators 905, and a plurality of LPFs 907. The multipliers 906 provides frequency conversion on the receive signals RX+ and RX− by multiplying the receive signals RX+ and RX− by subcarrier signals generated by the subcarrier wave generators 905. The LPFs 907 respectively attenuate unnecessary frequency bands on output signals from the multipliers 906 to reconstruct the data signals Sig1 to Sig3.

As described above, in the present embodiment, the multiplexer 900 multiplexes the data signals Sig1 to Sig4; the equalizer 112 expands frequency bands advantageous in wireless data transmission and outputs the transmit signals OUT+ and OUT– to the coupler 111. The module 110 can multiplex low-speed data signals with the multiplexer 900 and transmit high-speed transmit signals of, for example, several kbps to several Gbps with a pair of couplers 111. Because the module 110 uses a pair of couplers 111 to transmit the data signals Sig1 to Sig4 of different kinds, it is possible to decrease the ratio of the area for couplers to the data bandwidth. The multiplexer 900 and the demultiplexer 901 may be CDMA or TDMA multiplexer and demultiplexer; when these multiplexing technologies are combined together, the ratio of the area for couplers to the data bandwidth can be further optimized.

The equalizer 112 may be inserted between the termination resistors 126a and 126b and the demultiplexer 901. In this case, the multiplexer 900 performs multiplexing on the data signals Sig1 to Sig4 and outputs the transmit signals TX+ and TX–. The electrode 111a wirelessly transmits the transmit signal TX+ to the electrode 121a. The electrode 111b wirelessly transmits the transmit signal TX-to the electrode 121b. The termination resistor 126a is coupled to an interconnection node between the electrode 121a and one input terminal of the equalizer 112. The termination resistor 126b is coupled to an interconnection node between the electrode 121b and the other input terminal of the equalizer 112. The electrode 121a wirelessly receives the receive signal IN+ from the electrode 111a. The electrode 121b wirelessly receives the receive signal IN– from the electrode 111b. The equalizer 112 performs equalization on the receive signals IN+ and IN– and outputs the receive signals OUT+ and OUT–. The demultiplexer 901 receives the receive signals OUT+ and OUT– from the equalizer 112 as the receive signals RX+ and RX–. The demultiplexer 901 reconstructs the data signals Sig1 to Sig4 by performing demultiplexing on the receive signals RX+ and RX–. Also in this case, it is possible to achieve the same effect as the case described above.

As described above, the system 100 includes the multiplexer 900 and the demultiplexer 901. The module 110 includes the multiplexer 900 for providing multiplexing on a plurality of data signals to generate one signal and the coupler 111 for wirelessly transmitting a signal. The module 120 includes the coupler 121 for wirelessly receiving a signal by being coupled to the coupler 111 by at least one of electric-field coupling or magnetic-field coupling and the demultiplexer 901 for providing demultiplexing to reconstruct the plurality of data signals. The module 110 or 120 includes the equalizer 112 for providing equalization. It should be noted that the equalizer 112 is not necessarily included.

In FIG. 9, the module 110 includes the equalizer 112. The equalizer 112 performs equalization on one signal generated by the multiplexer 900 and outputs the one signal equalized to the coupler 111. The demultiplexer 901 reconstructs the plurality of data signals by performing demultiplexing on one signal wirelessly received by the coupler 121.

The equalizer 112 may be provided in a stage before the demultiplexer 901. In this case, the module 120 includes the equalizer 112. The multiplexer 900 outputs the one signal generated to the coupler 111. The equalizer 112 performs equalization on one signal wirelessly received by the coupler 121. The demultiplexer 901 reconstructs the plurality of data signals by performing demodulation on one signal equalized by the equalizer 112.

Alternatively, the equalizer 112 may be provided in a stage before the multiplexer 900. In this case, the module 110 includes the equalizer 112. The equalizer 112 performs equalization on a plurality of data signals. The multiplexer 900 generates one signal by performing multiplexing on the plurality of data signals equalized by the equalizer 112 and outputs the one signal generated to the coupler 111. The demultiplexer 901 reconstructs the plurality of data signals by performing demultiplexing on one signal wirelessly received by the coupler 121.

In the present embodiment, because the multiplexer 900 provides multiplexing on a plurality of data signals, it is possible to increase the amount of data transmittable within the limited transmit bandwidth (the frequency bandwidth usable for transmission) between the couplers 111 and 121. As a result, the system 100 can increase the speed of wireless communication. It should be noted that the equalizer 112 is not necessarily included.

Third Embodiment

Figure 11:
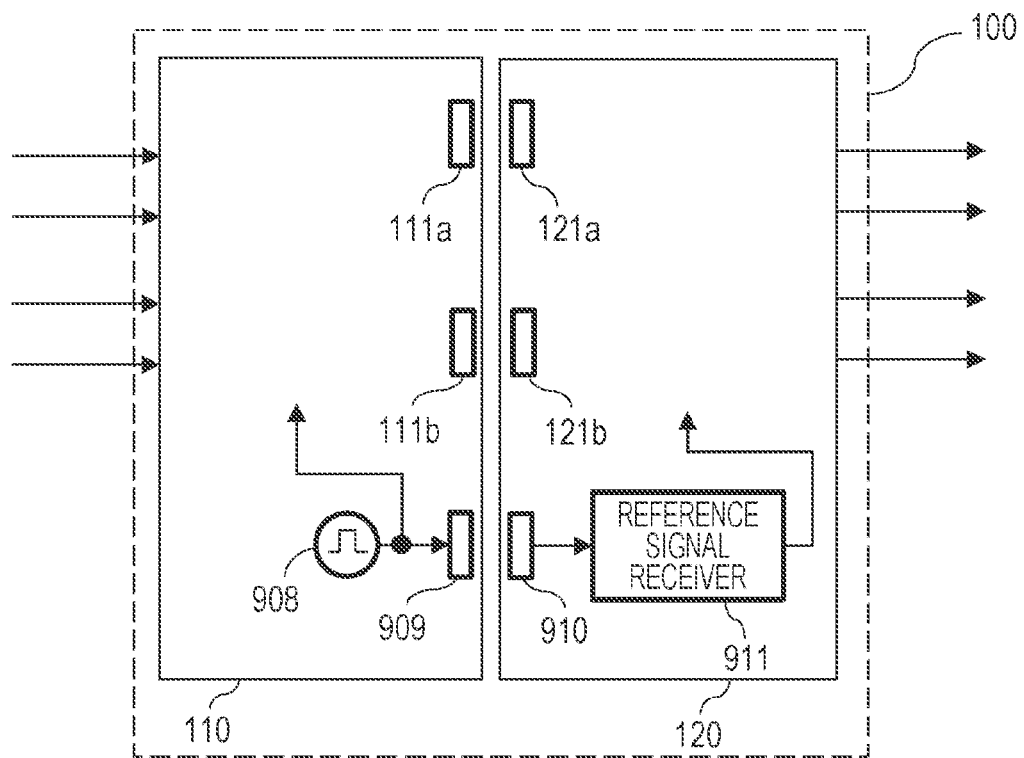
FIG. 11 illustrates an example of a configuration of a wireless communication system.

FIG. 11 illustrates an example of a configuration of the system 100 according to a third embodiment. The system 100 includes the modules 110 and 120. The module 110 is formed by adding a reference signal generator 908 and a coupler 909 to the module 110 of the first or second embodiment. The module 120 is formed by adding a coupler 910 and a reference signal receiver 911 to the module 120 of the first or second embodiment.

The module 110 includes the reference signal generator 908 and the coupler 909. The coupler 909 is an electrode. The module 120 includes the reference signal receiver 911 and the coupler 910. The coupler 910 is an electrode. It is desirable that the reference signal generator 908 be configured as a reference frequency source (a clock source) of the system 100; the reference signal generator 908 generates a reference frequency signal (a clock signal).

The modulator 113 or multiplexer 900 included in the module 110 uses the reference frequency signal generated by the reference signal generator 908 as a reference frequency to perform particular signal processing. The couplers 909 and 910 are coupled to each other via an electromagnetic field in the same manner as the couplers 111 and 121. The reference signal generator 908 outputs the reference frequency signal to the coupler 909. The reference frequency signal inputted to the coupler 909 is transmitted by electromagnetic field coupling to the coupler 910.

The reference signal receiver 911 performs, for example, waveform shaping on the reference frequency signal outputted from the coupler 910. The demodulator 122 or demultiplexer 901 included in the module 120 uses the reference frequency signal outputted by the reference signal receiver 911 as a reference frequency to perform particular signal processing.

When the modules 110 and 120 are separated from each other across space, and the modules 110 and 120 do not have a common reference frequency source, it is necessary to generate a pseudo-reference-frequency signal using a transmitting data signal to transmit the data signal between the couplers 111 and 121. The function of generating this pseudo-reference-frequency signal is usually complex, and the circuit size becomes relatively large. This may cause increases in cost and size of the modules.

As in the present embodiment, by newly providing the function of sharing a reference frequency signal between the modules 110 and 120, the necessity of the function of generating a pseudo-reference-frequency signal is eliminated, thereby reducing the cost and size of the modules. Because the reference frequency signal transmitted between the couplers 909 and 910 is constant in frequency, the reference frequency signal barely limits the transmission characteristic. The cost and size of required modules are less in the case of transmitting a reference frequency signal between the couplers 909 and 910 than in the case of adding the function of generating a pseudo-reference-frequency signal.

As described above, the module 110 includes the reference signal generator 908 for generating a reference signal (a clock signal) and the coupler 909 for wirelessly transmitting a reference signal generated by the reference signal generator 908. The module 120 includes the coupler 910 for wirelessly receiving a reference signal by being coupled to the coupler 909 by at least one of electric-field coupling or magnetic-field coupling. The module 120 also includes the reference signal receiver 911 for shaping the waveform of the reference signal wirelessly received by the coupler 910.

The present embodiment can be used with the first embodiment. In this case, the modulator 113 provides modulation based on a reference signal generated by the reference signal generator 908. The demodulator 122 provides demodulation based on a reference signal subjected to waveform shaping by the reference signal receiver 911.

The present embodiment can also be used with the second embodiment. In this case, the multiplexer 900 provides multiplexing based on a reference signal generated by the reference signal generator 908. The demultiplexer 901 provides demultiplexing based on a reference signal subjected to waveform shaping by the reference signal receiver 911.

The cost and size of the system 100 is less in the present embodiment than in the case of adding the function of generating a pseudo-reference-frequency signal.

The embodiments described above are merely specific examples realizing various features of the present disclosure, and these embodiments should not be interpreted as limiting the scope of the invention. The present invention is not limited to the embodiments described above, and various changes and modifications may be made.

Various embodiments of the present disclosure can increase the speed of wireless communication.

While the present disclosure has been described with reference to example embodiments, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2021-174353 filed Oct. 26, 2021, which is hereby incorporated by reference herein in its entirety.

What is claimed is:

1. A wireless communication system comprising:
   a first communication device including
      a modulator configured to provide modulation, and
      a first coupler configured to wirelessly transmit a signal, and
      a reference signal generator configured to generate a reference signal, and
      a third coupler configured to wirelessly transmit the reference signal generated by the reference signal generator; and
   a second communication device including
      a second coupler configured to wirelessly receive a signal by being coupled to the first coupler by at least one of electric-field coupling or magnetic-field coupling, and
      a demodulator configured to provide demodulation, and
      a fourth coupler configured to wirelessly receive the reference signal by being coupled to the third coupler by at least one of electric-field coupling or magnetic-field coupling, and
      a reference signal receiver configured to provide waveform shaping on the reference signal wirelessly received by the fourth coupler,
   wherein the modulator is configured to provide modulation based on the reference signal generated by the reference signal generator, and
   wherein the demodulator is configured to provide demodulation based on the reference signal subjected to waveform shaping by the reference signal receiver, and
   wherein the first communication device or the second communication device includes an equalizer configured to provide equalization.

2. The wireless communication system according to claim 1, wherein
   the first communication device includes the equalizer,
   the equalizer is configured to provide equalization on a signal subjected to modulation by the modulator and output the signal subjected to equalization to the first coupler, and
   the demodulator is configured to provide demodulation on a signal wirelessly received by the second coupler.

3. The wireless communication system according to claim 1, wherein
   the second communication device includes the equalizer,
   the modulator is configured to output a signal subjected to modulation to the first coupler,
   the equalizer is configured to provide equalization on a signal wirelessly received by the second coupler, and
   the demodulator is configured to provide demodulation on the signal subjected to equalization by the equalizer.

4. The wireless communication system according to claim 1, wherein
   the first communication device includes the equalizer,
   the modulator is configured to provide modulation on a signal subjected to equalization by the equalizer and output the signal subjected to modulation to the first coupler, and
   the demodulator is configured to provide demodulation on a signal wirelessly received by the second coupler.

5. The wireless communication system according to claim 1, wherein
   the equalizer is configured to provide equalization to increase a gain between the first coupler and the second coupler in a lower frequency region with respect to a transmission characteristic.

6. The wireless communication system according to claim 1, wherein
   the second communication device further includes a termination resistor coupled to the second coupler.

7. A wireless communication system comprising:
   a first communication device including
      a modulator configured to generate one signal by providing modulation on a plurality of data signals, and
      a first coupler configured to wirelessly transmit a signal, and a reference signal generator configured to generate a reference signal, and a third coupler configured to wirelessly transmit the reference signal generated by the reference signal generator; and a second communication device including a second coupler configured to wirelessly receive a signal by being coupled to the first coupler by at least one of electric-field coupling or magnetic-field coupling, and a demodulator configured to reconstruct the plurality of data signals by providing demodulation, and a fourth coupler configured to wirelessly receive the reference signal by being coupled to the third coupler by at least one of electric-field coupling or magnetic-field coupling, and a reference receiver configured to provide waveform shaping on the reference signal wirelessly received by the fourth coupler, wherein the modulator is configured to provide modulation based on the reference signal generated by the reference signal generator, and wherein the demodulator is configured to provide demodulation based on the reference signal subjected to waveform shaping by the reference signal receiver.

8. The wireless communication system according to claim 7, wherein the first communication device or the second communication device includes an equalizer configured to provide equalization.

9. The wireless communication system according to claim 8, wherein the first communication device includes the equalizer, the equalizer is configured to provide equalization on one signal generated by the modulator and output the one signal subjected to equalization to the first coupler, and the demodulator is configured to reconstruct the plurality of data signals by providing demodulation on one signal wirelessly received by the second coupler.

10. The wireless communication system according to claim 8, wherein the second communication device includes the equalizer, the modulator is configured to output the one signal generated to the first coupler, the equalizer is configured to provide equalization on one signal wirelessly received by the second coupler, and the demodulator is configured to reconstruct the plurality of data signals by providing demodulation on the one signal subjected to equalization by the equalizer.

11. The wireless communication system according to claim 8, wherein the first communication device includes the equalizer, the equalizer is configured to provide equalization on a plurality of data signals, the modulator is configured to generate one signal by providing modulation on the plurality of data signals subjected to equalization by the equalizer and output the one signal generated to the first coupler, and the demodulator is configured to reconstruct the plurality of data signals by providing demodulation on one signal wirelessly received by the second coupler.

12. A wireless communication system comprising:

a first communication device including a multiplexer configured to generate one signal by providing multiplexing on a plurality of data signals, and a first coupler configured to wirelessly transmit a signal, and a reference signal generator configured to generate a reference signal and a third coupler configured to wirelessly transmit the reference signal generated by the reference signal generator; and a second communication device including a second coupler configured to wirelessly receive a signal by being coupled to the first coupler by at least one of electric-field coupling or magnetic-field coupling, and a demultiplexer configured to reconstruct the plurality of data signals by providing demultiplexing, a fourth coupler configured to wirelessly receive the reference signal by being coupled to the third coupler by at least one of electric-field coupling or magnetic-field coupling, and a reference signal receiver configured to provide waveform shaping on the reference signal wirelessly received by the fourth coupler, wherein the multiplexer is configured to provide multiplexing based on the reference signal generated by the reference signal generator, and wherein the demultiplexer is configured to provide demultiplexing based on the reference signal subjected to waveform shaping by the reference signal receiver.

13. The wireless communication system according to claim 12, wherein the first communication device or the second communication device includes an equalizer configured to provide equalization.

14. The wireless communication system according to claim 13, wherein the first communication device includes the equalizer, the equalizer is configured to provide equalization on the one signal generated by the multiplexer and output the one signal subjected to equalization to the first coupler, and the demultiplexer is configured to reconstruct the plurality of data signals by providing demultiplexing on one signal wirelessly received by the second coupler.

15. The wireless communication system according to claim 13, wherein the second communication device includes the equalizer, the multiplexer is configured to output the one signal generated to the first coupler, the equalizer is configured to provide equalization on one signal wirelessly received by the second coupler, and the demultiplexer is configured to reconstruct the plurality of data signals by providing demodulation on the one signal subjected to equalization by the equalizer.

16. The wireless communication system according to claim 13, wherein the first communication device includes the equalizer, the equalizer is configured to provide equalization on a plurality of data signals, the multiplexer is configured to generate one signal by providing multiplexing on the plurality of data signals subjected to equalization by the equalizer and output the one signal generated to the first coupler, and the demultiplexer is configured to reconstruct the plurality of data signals by providing demultiplexing on one signal wirelessly received by the second coupler.

17. An operating method of a wireless communication system including a first communication device and a second communication device, the operating method comprising:

providing modulation with a modulator of the first communication device;

wirelessly transmitting a signal with a first coupler of the first communication device;

wirelessly receiving a signal with a second coupler of the second communication device by being coupled to the first coupler by at least one of electric-field coupling or magnetic-field coupling;

providing demodulation with a demodulator of the second communication device; and providing equalization with an equalizer of the first communication device or the second communication device, and generating a reference signal with a generator of the first communication device, and wirelessly transmitting the reference signal with a third coupler of the first communication device;

wirelessly receiving a reference signal with a fourth coupler of the second communication device by being coupled to the third coupler by at least one of electric-field coupling or magnetic-field coupling, and providing, by a reference signal receiver, waveform shaping on the reference signal wirelessly received by the fourth coupler, wherein the modulator is configured to provide modulation based on the reference signal generated by the reference signal generator, and wherein the demodulator is configured to provide demodulation based on the reference signal subjected to waveform shaping by the reference signal receiver.

* * * * *